United States Patent [19]

Allen

[11] 4,393,181

[45] Jul. 12, 1983

[54] POLYFUNCTIONAL PHENOLIC-MELAMINE EPOXY RESIN CURING AGENTS

[75] Inventor: Roy A. Allen, Houston, Tex.

[73] Assignee: Shell Oil Company, Houston, Tex.

[21] Appl. No.: 393,974

[22] Filed: Jun. 30, 1982

[51] Int. Cl.³ .................... C08L 61/00; C08G 59/14; C08F 283/00
[52] U.S. Cl. .............................. 525/504; 525/523; 528/118; 528/407; 544/196; 544/197
[58] Field of Search ............... 525/504, 523; 528/118, 528/407; 544/196, 197

[56] References Cited

U.S. PATENT DOCUMENTS

| | | | |
|---|---|---|---|
| 2,658,885 | 11/1953 | D'Alelio | 260/53 |
| 3,214,409 | 10/1965 | Peerman | 525/504 |
| 3,256,226 | 6/1966 | Fekete et al. | 260/23.5 |
| 3,265,664 | 8/1966 | Fulmer et al. | 528/118 |
| 3,329,652 | 7/1967 | Christie | 260/47 |
| 3,336,241 | 8/1967 | Shokal | 260/2 |
| 3,356,645 | 12/1967 | Warren | 260/47 |
| 3,373,075 | 3/1968 | Fekete et al. | 161/185 |
| 3,394,105 | 7/1968 | Christie | 260/47 |
| 3,413,268 | 11/1968 | Feichtinger et al. | 528/118 |
| 3,418,333 | 12/1968 | Warren | 260/309 |
| 3,438,937 | 4/1969 | Christie | 260/47 |
| 3,477,990 | 11/1969 | Dante et al. | 260/47 |
| 3,756,984 | 9/1973 | Klaren et al. | 260/47 |
| 3,808,226 | 4/1974 | Habermeler et al. | 260/309.5 |
| 3,847,769 | 11/1974 | Garratt et al. | 204/159.22 |
| 3,996,121 | 12/1976 | Green et al. | 204/159.23 |
| 4,108,803 | 8/1978 | Green et al. | 96/76 R |
| 4,147,676 | 4/1979 | Pampouchidis | 260/23 TN |
| 4,162,274 | 7/1979 | Rosenkranz | 528/75 |
| 4,189,421 | 2/1980 | Shay et al. | 525/523 |
| 4,217,377 | 8/1980 | Shay et al. | 427/195 |
| 4,253,918 | 3/1981 | Traenckner et al. | 204/159.22 |
| 4,309,529 | 1/1982 | Wendling | 528/289 |

FOREIGN PATENT DOCUMENTS 1362906  8/1974  United Kingdom.
1400286  7/1975  United Kingdom.
1489425  10/1977  United Kingdom.

OTHER PUBLICATIONS

Derwent C. P. I. Abstract Nos. 52728B/29, 20635C/12 and 44508D/25.

Primary Examiner—Lucille M. Phynes
Attorney, Agent, or Firm—Norris E. Faringer

[57] ABSTRACT

The present invention is directed to epoxy curing agents prepared by reacting a polyhydric phenol with a hexaalkyl ether of hexamethylol melamine in an amount to provide at least two phenolic hydroxyl groups to one methoxy group. The invention is further directed to curable epoxy compositions.

9 Claims, No Drawings

POLYFUNCTIONAL PHENOLIC-MELAMINE EPOXY RESIN CURING AGENTS

FIELD OF THE INVENTION

This invention is directed to polyfunctional phenolic adducts of polyhydric phenols and amino-triazines which are useful as epoxy curing agents, especially solid epoxy resins in powder coating applications.

BACKGROUND OF THE INVENTION

U.S. Pat. No. 4,217,377 describes a crosslinking agent for powder coatings which is a low molecular weight adduct of a monohydroxy, single ring aromatic carbon compound and a hexakis (alkoxymethyl) amino-triazine. The products described in U.S. Pat. No. 4,217,377 retain two of the six theoritical methoxy group of the triazine during the preparation, as the methoxy groups are the crosslinking groups of the adduct.

A novel polyhydric, polynuclear phenol-melamine adduct has now been found which is an effective crosslinking agent for epoxy resins and which contain no methoxy groups. As noted, the adducts of U.S. Pat. No. 4,217,377 contain unreacted methoxy groups. The present adducts, on the other hand, are prepared by reacting the phenol with the triazine so that the ratio of phenolic OH groups to methylol groups is at least 2:1, all methylol groups are thus reacted, to produce a phenolic-terminated oligomer which will cure via etherification with the epoxy groups of the epoxy resin. Thus, the present novel adducts provide melamine resin type properties in the cured film without evolving methanol thereby essentially preventing void formation due to emission of volatiles during cure. This is particularly important in rapid curing, thick (~10–20 mil) castings where void formation can be a problem.

SUMMARY OF THE INVENTION

This invention is directed to the reaction products (adducts) of amino-triazines and polyhydric phenols and to a method for preparing them. The resulting adducts are solid light-colored, friable products which are especially suitable for use as crosslinking agents for epoxy resins in powder coatings. The resulting coatings are characterized by excellent film properties and rapid cure rates.

More particularly, this invention is directed to the reaction products of hexamethoxymethylmelamine and 2,2-bis(4-hydroxyphenyl)propane, BPA, which are especially suitable as curing agents for epoxy resins when used with imidazole compound accelerators. These curing agents produce compositions which cure rapidly at elevated temperatures to produce coatings which exhibit good flexibility and improved solvent resistance when compared with analogous existing epoxy resin coatings. The present invention also provides a curable epoxy composition.

DESCRIPTION OF THE PREFERRED EMBODIMENTS

The compositions of the present invention are simply prepared by heating and reacting a stoichiometric excess of a polyhydric phenol with an amino-triazine at a temperature between about 100° and 250° C., preferably in the absence of any added acidic catalyst and continuing the reaction until the evolution of methanol ceases.

Although the reaction can be accelerated by acidic catalysts such as oxalic acid, para-toluenesulfonic acid, and the like, the resulting curing agent adduct is preferably used with alkaline curing catalysts such as the alkyl imidazoles, tris-dimethylaminomethylphenol and the like; therefore the preferred method does not employ an acidic catalyst, but includes an alkaline catalyst.

Preferred polyhydric phenols which are useful for preparing the curing agent adducts are the polyhydric phenols containing from 2 to 6 OH groups and up to 30 carbon atoms. Coming under special consideration are the phenols of the formula

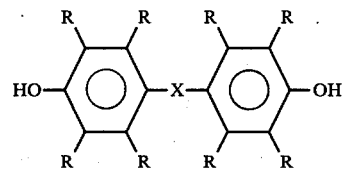

wherein X is a polyvalent element or radical and R is a member of the group consisting of hydrogen, halogen and hydrocarbon radicals. The preferred elements or radicals represented by X are oxygen, sulfur, —SO—, —SO$_2$—, bivalent hydrocarbon radicals containing up to 10 carbon atoms, and oxygen, sulfur and nitrogen-containing hydrocarbon radicals, such as

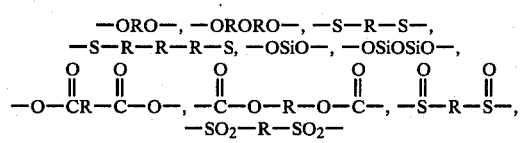

radical wherein R is a bivalent hydrocarbon radical. A very preferred dihydric phenol is 2,2-bis(4-hydroxyphenyl)propane, BPA.

Suitable amino-triazines have the general formula;

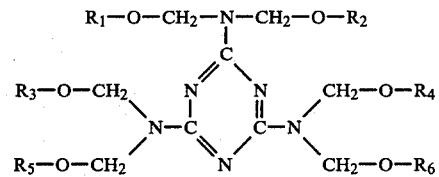

wherein the R substituents, $R_1$, $R_2$, $R_3$, $R_4$, $R_5$, and $R_6$ are either the same or different and are alkyl radicals of 1 to 4 carbon atoms.

The hexa-alkyl ethers of hexamethylol melamine, i.e. the hexakis (alkoxymethyl) amino-triazine may be characterized by the above-identified formula and includes specific compounds such as hexakis (methoxymethyl) amino-triazine, hexakis (ethoxymethyl) amino-triazine, hexakis (propoxymethyl) amino-triazine, hexakis (isopropoxymethyl) amino-triazine, hexakis (butoxymethyl) amino-triazine, hexakis (1-butoxymethyl) amino-triazine, hexakis (isobutoxymethyl) amino-triazine and combinations thereof in any proportion.

The polyhydric phenol is reacted with the hexa-alkyl ethers of hexwmethylol melamine in an amount to provide at least two phenolic hydroxyl groups to one alkoxy group. Preferably, the ratio of phenolic hydroxyl groups to alkoxy groups is about 3:1. The reaction is preferably carried out at a temperature between about 120° C. to about 200° C. (most preferred temperature, about 175° C.) until the evolution of methanol ceases, i.e., for from about 1.5 hours to about 3 hours.

The resulting adduct is a phenolic-terminated oligomer which is an effective curing agent for epoxy resins, particularly in powder coating formulations containing alkaline epoxy curing accelerators.

POLYEPOXIDES

Suitable polyepoxides which may be cured with these adducts include those compounds possessing more than one vic-epoxy group per molecule, i.e., more than one

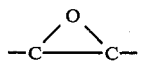

group per molecule. These polyepoxides are saturated or unsaturated aliphatic, cycloaliphatic, aromatic or hetercyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohol. As used herein the terms "epoxide equivalent weight" and "weight per epoxide" (WPE) refer to the average molecular weight of the polyepoxide molecule divided by the average number or oxirane groups present in the molecule.

Various examples of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight (WPE) between about 140 and 2,000. Especially preferred are the diglycidyl polyethers of 2,2-bis(4-hydroxyphenyl)propane having a WPE between about 140 and 925 and an average molecular weight of from about 300 to about 1800.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241, are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., the glycidyl phenol-aldehyde condensates, as described in U.S. Pat. No. 2,658,885.

The amount of adduct used for curing the epoxy resin will be a curing amount. Generally, the amount employed will be near a stoichiometric amount although up to a 100% excess of either the epoxy resin or the adduct may be employed.

In powder coating applications, a curing agent accelerator is preferably employed. Suitable curing agent accelerators include the alkaline compounds such as the amines, amides, polyaminoamides, etc. Very suitable curing agent accelerators include the imidazoles and benzimidazoles as well as their salts and adducts. Suitable such imidazole compounds including the imidazole-epoxy adducts, salts, etc, are disclosed in U.S. Pat. Nos. 3,756,984; 3,329,652; 3,438,937; 3,356,645; 3,394,105; and 3,418,333. Accordingly, the disclosure relevant to the preparation of these imidazoles and benzimidazoles as well as their adducts, salts, etc. is hereby incorporated herein.

Other curing agent accelerators include the stannous salts of monocarboxylic acids having at least 2 carbon atoms, and more preferably from about 6 to 12 carbon atoms. Examples of operable stannous salts include, among others, stannous caproate, stannous octoate, stannous laurate, stannous palmitate, stannous stearate, stannous oleate and stannous naphthenate. Stannous octoate is particularly preferred.

Other suitable curing accelerators include the alkali metal salts such as lithium benzoate, lithium octoate, lithium naphthenate, lithium stearate, lithium neodecanoate, and the like.

Still other suitable but not preferred curing accelerators (catalysts) include the hydroxides of the alkaline earth and alkali metals such as sodium hydroxide, potassium hydroxide, calcium hydroxide, etc.

The amount of accelerator may vary within wide limits from about 0.01 to about 10 parts per hundred by weight of polyepoxide (phr), and preferably from about 0.05 to 5.0 phr.

Other materials may, of course, be blended or mixed to the adduct-curing agent-epoxy compositions, including plasticizers, stabilizers, extenders, resins, tars, pigments, reinforcing agents, thixotropic agents, flow control agents, antioxidants, and the like.

The present adducts can be utilized in epoxy resin compositions for use in many applications, such as for coatings and impregnating compositions in the preparation of adhesives for metals, wood, cement and the like, and in preparation of reinforced composite products, such as laminated products, filament windings, sheet molding compounds (SMC), electrical laminates, molding powders, fluidized bed powders, potting compounds, etc. A very suitable application is in the preparation of reinforced products and laminates wherein the compositions are applied to fibrous products such as glass fibers or sheets and the material formed into the desired object and cured.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Polyepoxide A is a glycidyl polyether of 2,2-bis(4-hydroxyphenyl)propane having a WPE of 190–198).

Polyepoxide B is a polyglycidyl ether of BPA having a WPE of 850–950 and containing 0.5% by weight of flow control agent (Modiflow II).

HMMM is hexamethoxymethyl-melamine (CYMEL ® Resin 303).

BPA is 2,2-bis(4-hydroxyphenyl)propane.

EXAMPLE I

One mole of HMMM (390 grams) and nine moles (2052 grams) of BPA were heated to 280° F. at which temperature methanol was evolved. The temperature was raised to 350° F. over a 90 minute period and held a 350° F. until evolution of methanol was essentially nil (about 1½ hours). The product was then poured out to yield a light colored friable solid with a phenolic OH content of 0.66 eq/100 grams and a viscosity of 7.3 poises (40% N.V. in MEK at 25° C.).

EXAMPLE II

The product of Example I was prepared and just before completion 128 grams of 2-methylimidazole were added and physically stirred in for 20 minutes before pouring out.

EXAMPLE III

A charge of 350 grams HMMM and 3150 grams BPA (corresponding to a 1 to 9 weight ratio, or a 1/15.4 molar ratio) were heated to 140° (285° F.) at which point initial evolution of methanol was noted. The temperature was then raised to 177° C. (350° F.) over a 2½ hour period, and held at 177° C. (350° F.) until the methanol evolution was essentially nil. The BPA/HMMM adduct was poured out into a tray to cool. The product was a light colored friable solid with the following constants.

| | |
|---|---|
| Phenolic OH content: | 0.75 eq/100 grms. |
| Viscosity (ASTM D217076) | |
| 40% N.V. in MEK | 4.1 centipoise |

EXAMPLE IV

A catalyzed version of Example III was prepared by stirring 184 grams of 2-methylimidazole into the adduct for 20 minutes before pouring out.

EXAMPLE V

In this example a solid epoxy resin with increased functionally was prepared by charging 2600 grams of polyepoxide A, 798 grams of BPA, m.p. of 156–157 and 106 grams of a phenolic novolac resin with a molecular weight (Mn) of 485 and a hydroxyl number in the 570–600 range. The batch temperature was raised to 115° C. (220° F.) and 1.1 grams of a 50% aqueous solution of tetramethyl ammonium chloride was added. The temperature was further raised to 160° C. (320° F.) and allowed to exotherm to 168° C. (335° F.). The batch was held at 168° C. (335° F.) for 90 minutes and poured out to cool. The product was a solid friable resin with a WPE of 670, and a viscosity of 16 cps as a 40% Non volatile solution in MEK.

EXAMPLES VI, VII, VIII, and IX

The compositions of Examples I, II, III, and V were formulated (dry blended) in a Welex mixer, extruded in a BUS PR-46 laboratory size extruder @ 60° C. barrel temperature and each was ground into a powder suitable for fluidized bed application.

It will be appreciated that the compositions of Examples I and III are the curing agent adducts of BPA and HMMM, whereas the compositions of Examples II and IV are the adducts of Examples I and III respectively wherein a catalytic amount of 2-methyl imidazole was physically blended therein.

The resulting formulations are tabulated in Table I.

The powders shown in Table I were applied via fluidized bed to cold rolled steel panels at 450° F. and postcured, one set of panels was postcured for 90 seconds before quenching, a second set for 120 seconds before quenching; the gel times, physical properties and cathodic disbonding results are shown in Table II.

The data in Table II shows that the BPA/HMMM cured systems are all more solvent resistant than the commercial control, while Examples VI and VII are superior in flexibility. In resistance to cathodic disbonding the BPA/HMMM cured systems are, on balance, equal to the control.

TABLE I

| | EXAMPLE VI | EXAMPLE VII | EXAMPLE VIII | EXAMPLE IX |
|---|---|---|---|---|
| Polyepoxide B | 1,211 | 1,177 | — | — |
| Resin from Example V | — | — | 1,131 | 1,141 |
| Phenolic Terminated Resin, Example I | 36 | 69 | 95 | — |
| Phenolic Terminated Resin, Example II | 129 | 130 | — | — |
| Phenolic Terminated Resin, Example III | — | — | 11 | 96 |
| Phenolic Terminated Resin, Example IV | — | — | 128 | 128 |
| Barytes #1 | 550 | 550 | 550 | 550 |
| Mica 4X | 183 | 183 | 183 | 183 |
| Red Iron Oxide | 30 | 30 | 30 | 30 |
| Cabosil M5 | 11 | 11 | 11 | 11 |
| Modaflow II | — | — | 11 | 11 |
| | 2,150[a] | 2,150[a] | 2,150[a] | 2,150[a] |

[a] parts by weight

TABLE II

|  | Experimental System vs Commercial Control | | | | |
|---|---|---|---|---|---|
|  | COMMERCIAL CONTROL | EXAMPLE VI | EXAMPLE VII | EXAMPLE VIII | EXAMPLE IX |
| Gel Time at 400° F. Seconds | 17.1 | 16.4 | 16.9 | 13.6 | 17.0 |
| Pencil Hardness[1] | | | | | |
| Cured 90 sec/450° F. | F | F | F | HB | HB |
| Cured 120 sec/450° F. | F | F | F | HB | HB |
| Solvent (MIBK) Resistance Minutes | | | | | |
| Cured 90 sec/450° F. | 15–20 | >30 | >30 | >30 | >30 |
| Cured 120 sec/450° F. | 20–25 | >30 | >30 | >30 | >30 |
| Flexibility:[2] In Degrees Per Pipe Diameter Bend | | | | | |
| Cured 90 Sec/450° F. | 6.1 | 10.9 | 10.7 | 5.4 | 3.8 |
| Cured 120 sec/450° F. | 5.6 | 8.8 | 6.5 | 6.8 | 5.5 |
| Cathodic Disbonding[3] Diameter of Disbonded Area In MM | | | | | |
| 48 Hrs @ 140° F. | 1.6 | 2.4 | 1.9 | 2.8 | 2.4 |
| 30 Days @ 77° F. | 3.2 | 2.8 | 4.4 | 2.0 | 4.0 |

[1]Scratch hardness as defined in ASTM D3363-74.
[2]Using a "Bell" tester (a hydraulic bending device) the test was performed at 32° F., a higher number indicates better flexibility
[3]Cell type, platinum wire electrode, 6 volts, 3% NaCl electrolyte.

What is claimed is:

1. An epoxy resin curing agent prepared by reacting a polyhydric phenol with an amino-triazine having the general formula

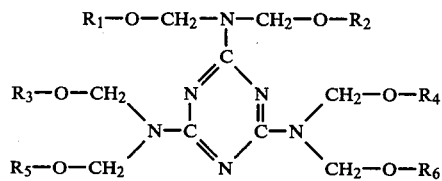

wherein $R_1$, $R_2$, $R_3$, $R_4$, $R_5$ and $R_6$ are the same or different alkyl radicals of 1 to 4 carbon atoms, said polyhydric phenol and amino-triazine being reacted in an amount to provide at least two phenolic hydroxyl groups to one alkoxy group.

2. The curing agent of claim 1 wherein the polyhydric phenol is 2,2-bis(4-hydroxyphenyl)propane.

3. The curing agent of claim 1 wherein the amino-triazine is hexamethoxy-methyl melamine.

4. The curing agent of claim 1 wherein the components are reacted at a temperature of from about 120° C. to about 200° C. until the evolution of methanol essentially ceases.

5. A heat curable composition, especially suitable for powder coating applications, comprising:
   (a) at least one normally solid epoxy resin containing at least one vicinal epoxy group,
   (b) a curable amount of a curing agent prepared as in claim 1, and
   (c) an alkaline epoxy curing agent accelerator.

6. The composition of claim 5 wherein the epoxy resin is a glycidyl polyether of 2,2-bis(4-hydroxyphenyl)propane.

7. The composition of claim 5 wherein the epoxy resin is a glycidyl novolac resin.

8. The composition of claim 5 wherein the epoxy curing agent accelerator is an imidazole compound.

9. The composition of claim 8 wherein the imidazole compound is 2-methylimidazole.

* * * * *